Dec. 29, 1970   C. G. WEAVER   3,551,164
PROCESS FOR MAKING COFFEE DRINK
Filed April 15, 1968   3 Sheets-Sheet 1

CLYDE G. WEAVER
INVENTOR.

BY Browning, Hyer,
Eickenroht + Thompson

ATTORNEYS

Dec. 29, 1970  C. G. WEAVER  3,551,164
PROCESS FOR MAKING COFFEE DRINK
Filed April 15, 1968  3 Sheets-Sheet 2

CLYDE G. WEAVER
INVENTOR.

BY Browning, Myer, Eckennoht + Thompson

ATTORNEYS

Dec. 29, 1970         C. G. WEAVER         3,551,164

PROCESS FOR MAKING COFFEE DRINK

Filed April 15, 1968         3 Sheets-Sheet 3

CLYDE G. WEAVER
INVENTOR.

BY Browning, Hyer,
Eickenroht & Thompson

ATTORNEYS

United States Patent Office 3,551,164
Patented Dec. 29, 1970

3,551,164
PROCESS FOR MAKING COFFEE DRINK
Clyde G. Weaver, 9900 Memorial, Apt. 44,
Houston, Tex. 77024
Filed Apr. 15, 1968, Ser. No. 721,500
Int. Cl. A23f 1/00
U.S. Cl. 99—65
9 Claims

ABSTRACT OF THE DISCLOSURE

A process for making a coffee drink in a dispensing or vending machine, including the steps of placing a suitable amount of soluble coffee in a pressure chamber within the machine, introducing hot water into the chamber, pressurizing the chamber so that the coffee is almost completely and instantly dissolved in the pressurized hot water, and collecting the coffee drink formed in a receptacle within the machine. The soluble coffee is placed on a screen disposed in the bottom of a cup, and the cup is then moved beneath and in sealing relation with the bottom of a cylinder to form the pressure chamber. The hot water introduced into the chamber is then forced through the screen under pressure by moving a piston from the top to the bottom of the cylinder.

---

This invention relates to an improved process for making coffee drink in a machine adapted to dispense it to a customer in response to his command.

Coffee solids used in making coffee drink are either coffee grounds, which are largely insoluble in hot water, or soluble coffee powders or crystals which dissolve completely in hot water. Coffee grounds are formulated by roasting and then grinding coffee beans, whereas soluble coffee powders or crystals are formulated by brewing coffee grounds to form a coffee solution and then dehydrating the solution. This dehydration process may be performed with or without the application of high temperature, in which latter case the crystals formed have been termed "freeze dry" coffee. The term "soluble coffee" will thus be used herein to refer to instant or freeze dry powders or crystals.

When coffee grounds are formed, some oils and other constituents of the coffee bean not necessary for making a coffee drink will generally be present. However, during the dehydration process for making soluble coffee, these constituents may be separated out so that the powder or crystals formed contain only the constituents necessary for making liquid coffee drink.

In order to extract the coffee flavor and coloring from coffee grounds, hot water may be recirculated through the grounds for a relatively long period of time, as in a percolator type coffee maker, the coffee grounds may be cooked in hot water and the grounds then filtered out, or hot water may be passed through the grounds under pressure, as in many coffee vending machines. These processes are commonly referred to as brewing and the coffee content of the resulting liquid depends on the temperature of the water, the harshness of the grounds used, the length of contact time between the grounds and the hot water, and, in the case of processes using pressure, the amount of pressure employed.

When soluble coffee powders or crystals are used, however, hot water is mixed with them to make a coffee solution as such powder or crystals dissolve in the hot water. The coffee content of the resulting solution, when all the powders are dissolved, depends only on the amount of powders used and the harshness thereof. However, the speed of this dissolving process is dependent on the temperature of the water, and, at best, the process is not always instant and may not be completed for as long as five minutes.

Early coffee vending or dispensing machines employed soluble coffee powders which were dispensed into a mixing bowl. Hot water was then poured in the bowl to dissolve the powders, and the resulting drink was then quickly dispensed to the customer. However, since soluble coffee does not instantly dissolve in hot water, the customer generally did not receive a coffee solution of uniform taste until at least several minutes after he had received the cup of coffee. To speed up the dissolving process, means for agitating the coffee solution in the mixing bowl have been used. Also, to insure that the cup of coffee received by a customer was in complete solution, pre-mixing and keeping a number of cups of coffee in escro has been suggested. However, the agitation did not insure a completely dissolved instant cup of coffee, and, if pre-mixing is employed, the coffee drawn off will not always be fresh because the premixing may have occurred as long as several hours before a customer request for a cup of coffee. For these reasons, vending machines using soluble coffee have generally come into disuse.

Instead, most presently used commercial vending machines use coffee grounds and some form of brewing process. However, these machines have several disadvantages. They are necessarily more complicated and expensive than machines using soluble coffee because when a cup of coffee is dispensed in these processes, some apparatus must be provided to discharge the spent grounds and clean the brewing chamber to ready it for the next customer request. If such apparatus is not provided, the coffee grounds must be placed in disposable cartridges or pods.

Also, the coffee drink produced by brewing generally has a relatively bitter taste because the oils and other coffee ground constituents not associated with the coffee flavor will be extracted from the grounds, or because harsh grounds must be used because of short hot water and coffee grounds contact time. These oils and other such constituents also contaminate the hoses and other parts of coffee vending machines that they come into contact with so that the machines require considerable maintenance and cleaning. Also, the coffee taste is not always uniform because the brewed solution is not always completely brewed until a few minutes after the customer has received the cup of coffee.

Thus, an object of this invention is to provide a process for making coffee drink in a coffee dispensing machine which obviates one or more of the above noted difficulties encountered in prior machines of this type.

Another object is to provide such a process which does not require a complicated and expensive apparatus for disposing spent coffee grounds and in which the coffee has a pleasing taste, regardless of the frequency with which it is dispensed and without the need for pre-mixing or escrowing.

A further object is to provide such a process which may be carried out in existing machines, with little or no alteration.

Another object is to provide such a process wherein the resulting coffee liquid formed is almost instantly of uniform solution so that the coffee drink a customer receives is in complete solution when he receives it.

Another object is to provide such a process in which such a coffee drink is formed without the use of harsh coffee grounds or powders.

Still another object is to provide such a process wherein the coffee solution dispensed into each cup has been formed just previous to its dispensing so that each cup of coffee is freshly made.

These and other objects, advantages, and features of the invention, which will be apparent from a consideration of the specification, claims, and appended drawings, are accomplished, according to the preferred form of the process of this invention, by placing a quantity of soluble coffee in a mixing and pressurizing chamber within the machine, introducing hot water into the chamber, then pressurizing the chamber to dissolve substantially all of the coffee therein. The coffee solution is forced by the pressure from the chamber to a receptacle and may then be dispensed from the receptacle into a suitable container or cup for use.

In the preferred form of the process, the dispensing machine in which the coffee is made includes a hopper for storing a quantity of soluble coffee, means for discharging a predetermined amount of such coffee from the hopper, and a chute for collecting the discharged coffee. In response to customer demand on the machine, a movable cup having a screen in the bottom thereof moves into a first position for receiving such predetermined amount of coffee from the chute, and then to a second position beneath a piston and cylinder, and above a receptacle which discharges into a drinking cup. In the second position, the cylinder and the cup are adapted to form the pressure chamber into which a suitable amount of hot water is introduced. The chamber is then pressurized by moving the piston through the cylinder and as the soluble coffee is dissolved, the solution formed is forced through the screen and into the receptacle. When the solution reaches the drinking cup substantially all of the soluble coffee has been dissolved and the customer receives a cup of coffee drink of uniform solution and pleasing taste.

In the drawings, wherein like reference numerals are used to designated like parts throughout:

Figure 1:
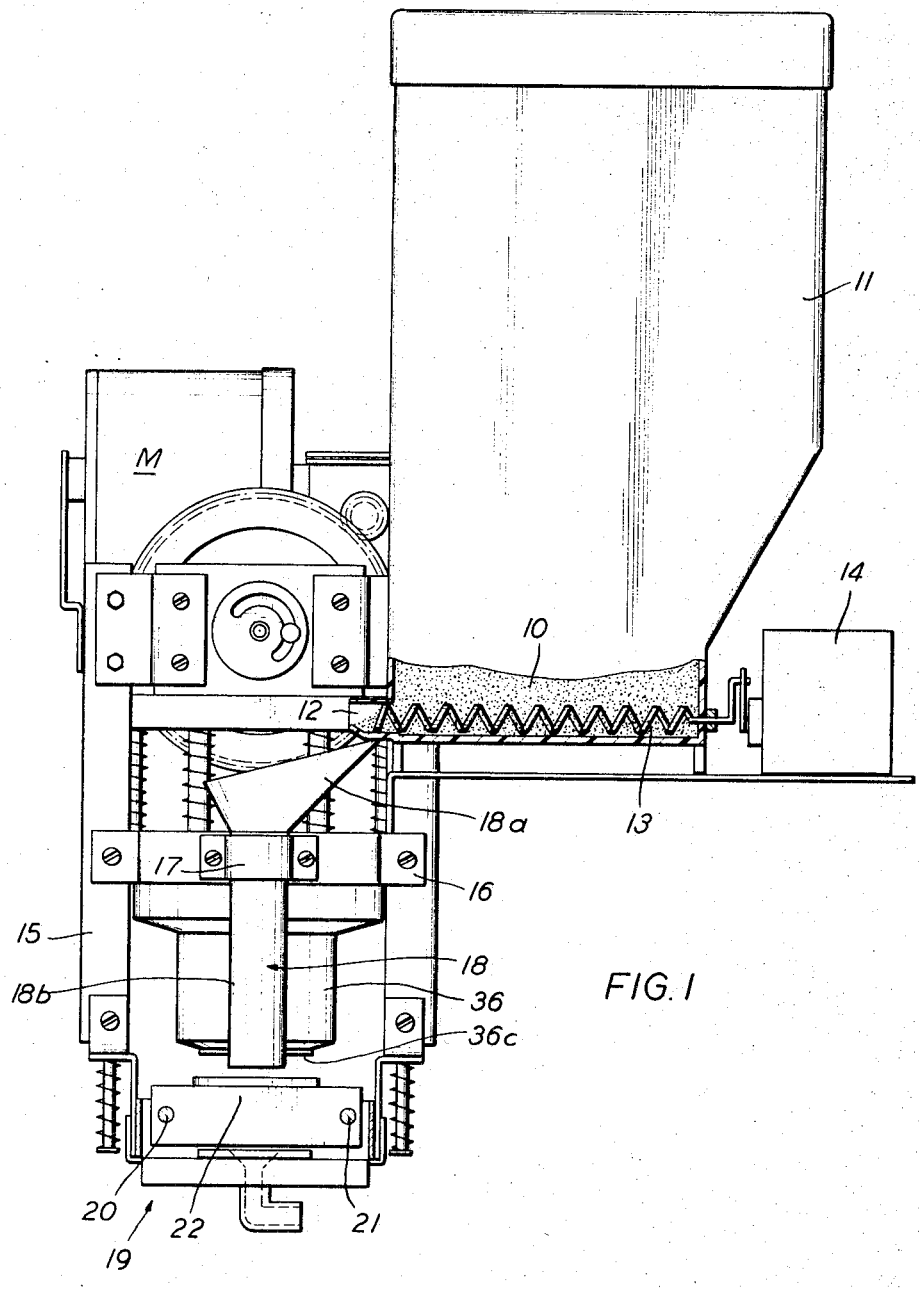
FIG. 1 is a front elevation view with a partial cut away illustrating apparatus forming part of a vending machine for use in making coffee in accordance with the process of this invention.

Referring now to the details of the drawings, the apparatus shown in FIG. 1 is typical in many respects of that found in commercially available brew coffee vending machines except that it has been modified for use in performing the process of this invention. Much of the modification has been directed to removing those components used in ground coffee processes, but not required for the present process, such as the means for dispensing spent coffee grounds. Dispensing machines capable of practicing this process may take other forms, particularly where such a machine is initially designed for use in performing this process as opposed to some of the prior processes discussed above.

Also, the apparatus illustrated in the drawings constitutes only those parts of an entire vending machine which are necessary in actually making the coffee drink in accordance with the process of this invention, when such process has been initiated in response to customer demand, as by the deposit of a coin in a vending machine. The other components such as the coin mechanism for initiating a coffee making cycle and the means for dispensing it when made, may be conventional and can be readily supplied by those skilled in the art.

As illustrated in FIG. 1, a supply of soluble coffee 10 is stored in a suitable canister or hopper 11 which may be mounted inside the wall of the vending machine (not shown). Disposed within the bottom of hopper 11 and extending horizontally to an opening spout 12 at the bottom of hopper 11 is a screw dispenser 13 which is connected to and driven by motor 14. Upon rotation of the dispenser 13 in the correct direction, soluble coffee powders are forced from the hopper 11 through spout 12.

Mounted also on an inside wall of the vending machine is a frame 15 upon which the remaining components to be described in connection with the description of this invention are mounted. Disposed beneath spout 12 and mounted on frame 15 by a horizontal bracket 16 and clamp 17 is a coffee chute 18 which includes a flared mouth 18a adapted to receive coffee powders from the spout 12 and a tubular portion 18b depending from the mouth.

Figure 2:
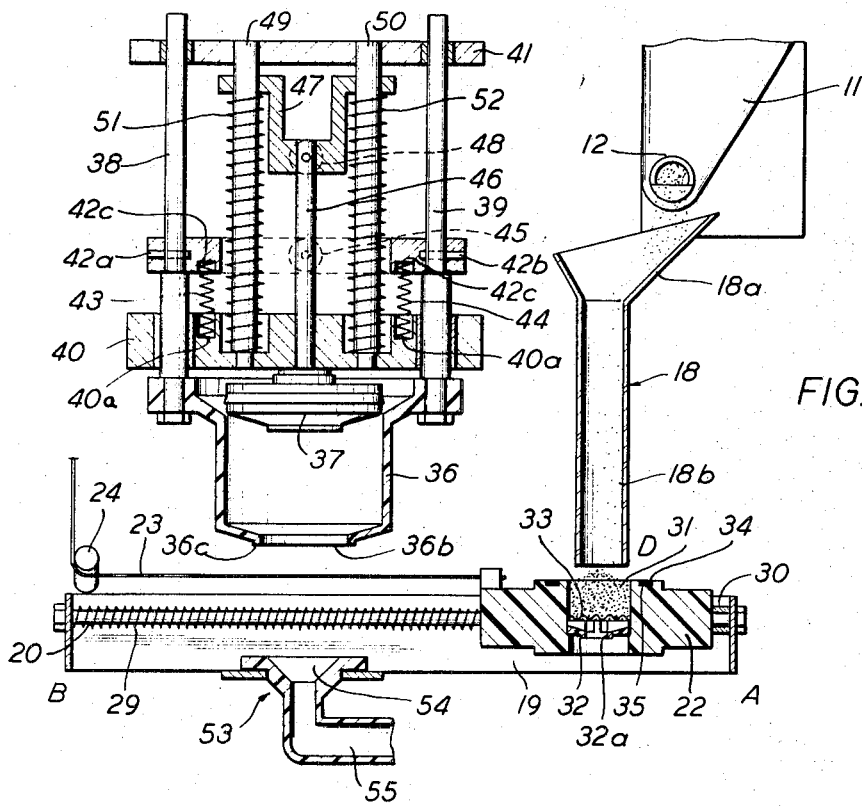
FIG. 2 is a side view, partially in elevation and partially in section, of such apparatus illustrating the position of the movable cup for receiving soluble coffee from the hopper.

Connected to the lower portion of frame 15 by suitable brackets is a track assembly 19 shown in more detail in FIG. 2 to include horizontally extending parallel rods 20 and 21 mounted at opposite ends of the assembly. A carriage 22 is movable along the rods between an end A and an end B thereof and to positions between the ends as described below with reference to FIGS. 2 through 5.

Figure 6:
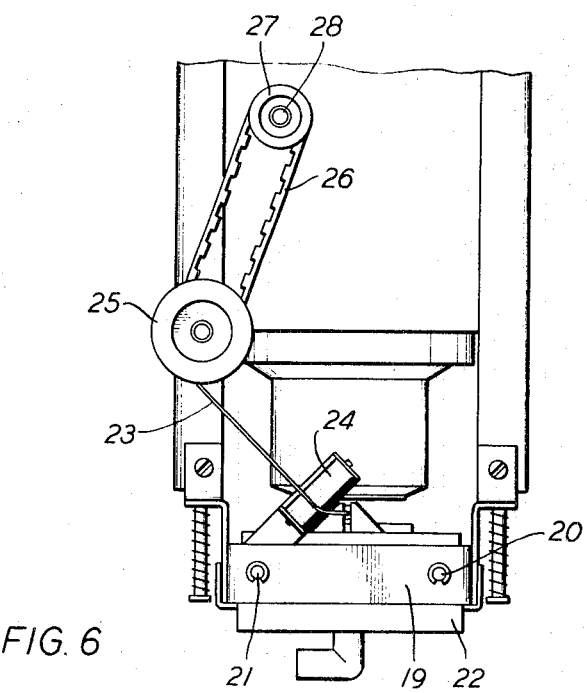
FIG. 6 is a back view in elevation of such apparatus illustrating the drive connection for moving the parts of such apparatus during the process.

As shown in FIGS. 2 and 6, a cable 23 is connected to carriage 22 for pulling it along the rods 20 and 21 from end A to end B. Cable 23 passes over a roller 24 to takeup spool 25, which is driven through a belt 26 and pulley 27 connected to a shaft 28 rotated by motor M. Spring 29 is disposed about each rod 20 and 21 to bias the carriage 22 toward end A so that, when cable 23 is slackened, carriage 22 will be moved along rods 20 and 21 to end A. Stops 30 are provided on the end A of each rod 20 and 21 to accurately position carriage 22 under the tubular portion 18b of chute 18, as shown in FIG. 2.

Figure 7:
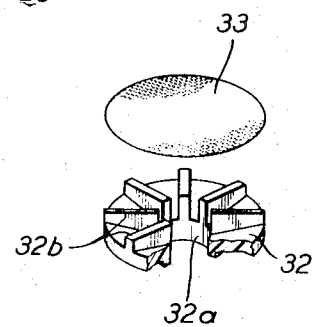
FIG. 7 is an exploded section view of a portion of the movable cup and the screen.

Carriage 22 has a cylindrical opening 31 through it and a partition 32 across the opening to form a movable cup 31a to receive the soluble coffee to be dissolved. As shown more fully in FIG. 7, partition 32 has an opening 32a in its center and raised ribs 32b adjacent and diverging from the opening. A screen 33 is placed on the raised members 32b so that when water is injected into cup 31a, it passes through screen 33 and opening 32a into opening 31 beneath the cup. The openings in screen 33 should be small nough to retard the passage of undissolved soluble coffee and water until the water is forced through them under substantial pressure. At least some of them should be large enough to allow passage of the partially dissolved coffee and coffee solution when such pressure is applied. However, these openings should not be so small that they are easily clogged by any individual soluble coffee powders that do not completely dissolve.

Also, a seal ring 34 of rubber or other suitable material is disposed in a groove 35 around the upper end of opening 31. The function of the seal ring 34 will be explained below in connection with the detailed description of this process.

Also carried by frame 15 and disposed at a suitable position above track assembly 19 intermediate ends A and B are a cylinder 36 and piston 37. As illustrated in FIG. 2, cylinder 36 includes an upper opening 36a, a lower opening 36b, and a lip 36c about opening 36b. Cylinder 36 is carried by support rods 38 and 39 each of which passes through and is movable vertically through openings in lower and upper frame members 40 and 41 which form a part of frame 15.

Rods 38 and 39 are enlarged at their lower ends which pass through frame member 40, and they also pass through suitable openings in a U-shaped movable bracket 42 to which they are secured by pins 42a and 42b. Compression springs 43 and 44 are disposed around rods 38 and 39 respectively, and each spring extends between member 40 and bracket 42, such as by being disposed in suitable openings 40a in member 40 and 42c in bracket 42. These springs 43 and 44 thereby normally bias bracket 42 upwardly so as to lift the rods 38 and 39, and thus the cylinder 36 to an upper position so that cylinder 36 is adjacent the bottom of frame member 40, as shown in FIG. 2.

Bracket 42 also includes a cam follower wheel 45 mounted thereon. When a downward force is applied to this wheel, such as by a cam surface (not shown), bracket 42, rods 38 and 39, are caused to move downward to the position shown in FIG. 3, and springs 43 and 44 are compressed. When this downward force is removed, springs 43 and 44 expand and cause cylinder 36 to move back to the upper position. The reason for the movement of the cylinder between these positions will be described shortly in connection with the detailed description of this process.

Piston 37 is also suspended from frame member 40 by means of a piston rod 46 which passes through an opening in frame member 40. The upper end of the piston rod 46 is connected to an operating beam 47, which is generally U-shaped in elevation. A cam follower wheel 48 is mounted on the beam 47, and beam 47 is slidably mounted on two vertical rods 49 and 50 which project upwardly from lower frame member 40 and are held at their upper ends by upper frame member 41.

Interposed between movable beam 47 and lower frame member 40 are a pair of compressible springs 51 and 52 each surrounding one of the rods 49 and 50. Piston 37 is thus suspended from beam member 47 in such a way that it can be forced downwardly against springs 51 and 52 when the cam follower wheels 48 is engaged by a cam surface (not shown). When this downward force is released, the springs 51 and 52 will expand and lift piston 37 to its upper position, as shown in FIG. 2.

Disposed and mounted on the bottom of track assembly 19 directly beneath but spaced from cylinder 36 is a receptacle 53 having a receiving cup 54 and a hose outlet 55 for carrying coffee drink received therein to a cup or other suitable container for use.

FIGS. 2 through 5 illustrate the various positions of the components described above during successive steps of the preferred process of this invention, although should other apparatus be employed to carry out the process, the sequence of steps may not be exactly as described. In any case, immediately following each dispensing cycle, it is preferred that carriage member 22 take a position C, such as in FIG. 5 whereby it is not directly under the coffee chute 18, but laterally between chute 18 and cylinder 36. This prevents steam that may rise from cup 31 because of the just completed contact with pressurized hot water during the preceding dispensing cycle from rising up and through chute 18 to dampen and thus ruin any stored soluble coffee which must be kept completely dry before use.

As illustrated in FIG. 2, after the initiation of the process, such as by a customer dropping a coin in the vending machine, carriage 22 is moved through cable 23 and by motor M to a position D beneath chute 18 and a suitable amount of soluble coffee powders is dispensed through spout 12 and chute 18 onto filter screen 33 in cup 31. The amount of coffee so dispensed depends on the length of time that the screw 13 is rotated, and this can be controlled and regulated by a timer, as is well known to those skilled in the art. The movement by carriage 22 to position D and the initiation of the dispensing of the coffee powders may begin simultaneously since there is a time delay between the start of such to the time the powder discharges from chute 18, provided that carriage 22 is positioned after the end of the preceding dispensing cycle so that it may move under chute 18 in time to catch all the powders discharged.

Figure 3:
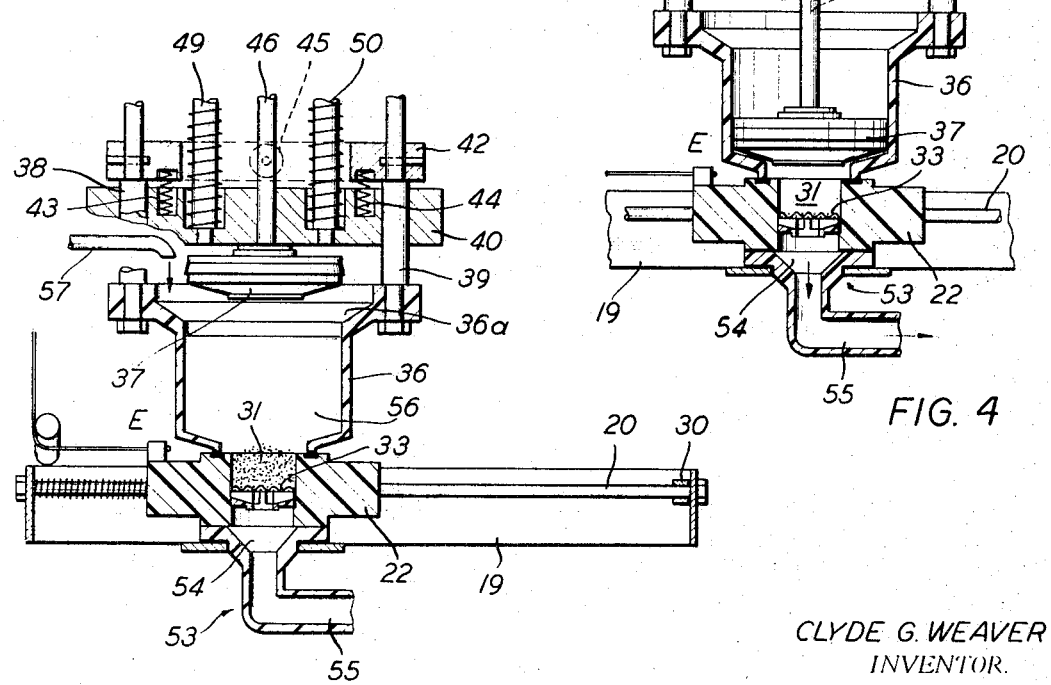
FIG. 3 is a partial side view, partly in elevation and partly in section, of such apparatus illustrating the position of the movable cup beneath the cylinder to form a pressure chamber and during introduction of hot water into the chamber.

After a suitable amount of soluble coffee is dispensed into cup 31, motor M is actuated to move carriage 22 to a position E beneath and adjacent to cylinder 36 and above receptacle 50, as illustrated in FIG. 3. Thus, opening 36b is in line with cup 31 and opening 32a is adjacent and in line with receiving cup 54. As shown in FIG. 3, when carriage 22 is positioned beneath cylinder 36, and cam follower wheel 45 is engaged by its cam, cylinder 36 is lowered so that its lower lip 36c forms a seal with seal ring 34 on the top of carriage 22. When this occurs, a pressure chamber 56 is formed above the screen 33. Also, as shown in FIG. 3, piston 37 is in its upper position so that hot water may be inserted into chamber 56 through a water spout 57 connected to a suitable source of hot water (not shown), until approximately that amount of water required for one cup of coffee is in chamber 56. When the hot water is injected into chamber 56, the coffee powders therein will begin to dissolve in the hot water.

Figure 4:
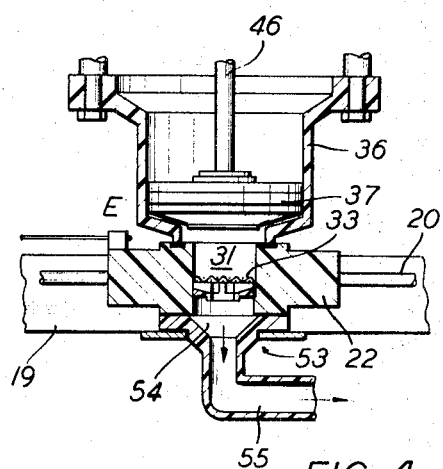
FIG. 4 is a partial side view, partly in elevation and partly in section, of such apparatus illustrating the movement of the piston to pressurize the pressure chamber and force water through the screen.

As previously described, in order to speed up the dissolution process, the hot water in chamber 56 is forced through filter screen 33 under substantial pressure. Thus, as shown in FIG. 4, downward movement of piston 37 presses down on the hot water to force it through filter screen 33 and opening 32a into receptacle 53. As this is done, substantially all the soluble powders on filter screen 44 not previously dissolved are almost instantly dissolved in the hot water, and the resulting liquid formed during the discharge from chamber 56 is a coffee drink of substantially uniform flavor and color.

Figure 5:
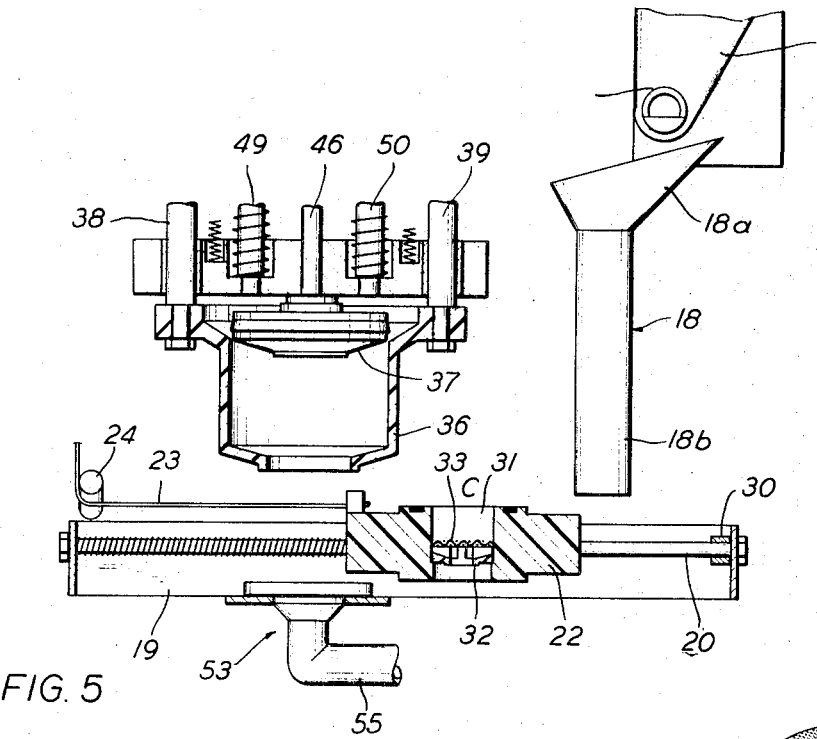
FIG. 5 is a partial side view, partly in elevation and partly in section, of such apparatus illustrating the position of the movable cup following the completion of one cycle of this process and preparatory to the start of another cycle.

To complete the process with the apparatus illustrated, piston 37 and cylinder 36 are then moved back to their respective upward positions, and carriage 22 is caused to move to its intermediate position C between cylinder 36 and chute 18 as illustrated in FIG. 5.

The sequence and movement of piston 37, cylinder 36, and carriage 22 are controlled by a series of gears and timing cams which are drivingly connected to a motor M, some of which are illustrated in general in FIG. 1. No attempt has been made to describe in detail the operation of motor M and its associated gears and cams as they form no part of this invention. However, the cylinder and piston section of the apparatus just described, is identical to that shown and described in U.S. Pat. No. 3,213,777 to William Heier and reference is made to that patent for further description of the apparatus employed and its operation in controlling and moving the piston 37 and cylinder 36 between their respective positions.

As is true in any coffee making process, the hotter the water used, the more rapid the dissolution of the soluble coffee powders or crystals. Thus, the water should be as hot as practical, but not above boiling or so hot as to burn customers. A range of 180° F. to 210° F. is usable, with a water temperature of about 200° F. being preferred.

From the foregoing it will be seen that this process and method is one well adapted to attain all of the ends and objects hereinbefore set forth, together with other advantages which are obvious and which are inherent to the method and apparatus.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A process of making liquid coffee within a machine adapted to dispense it in response to customer command, comprising the steps of: storing soluble coffee in a relatively dry area of the machine; placing a predetermined quantity of such soluble coffee in a pressurizing and mixing chamber within said machine; introducing hot water into said chamber to mix with the soluble coffee therein; pressurizing said chamber to dissolve substantially all of said coffee in said hot water to form a coffee solution while forcing said solution from said chamber and receiving said solution in a receptacle.

2. A process of making liquid coffee of the character defined in claim 1, including the further steps of initially receiving said quantity of soluble coffee on a filtering screen outside of said chamber; moving said screen into said chamber to place said soluble coffee therein prior to introduction of hot water; and moving said screen out of said chamber, after formation of said solution, into position for receiving another predetermined quantity of soluble coffee in response to another customer command.

3. A process of making liquid coffee of the character defined in claim 1, including the further steps of: initially receiving said quantity of soluble coffee in a cup outside of said chamber; moving said cup into said chamber to place said soluble coffee therein prior to introduction of said hot water; and moving said cup out of said chamber, after formation of said solution, into position for receiving another predetermined quantity of soluble coffee in response to another customer command.

4. A process of making liquid coffee of the character defined in claim 3, including the steps of receiving said quantity of soluble coffee on a screen which is disposed above an opening in the bottom of said cup, so that said pressure forces said hot water through said screen into said receptacle while dissolving said coffee.

5. A process of making liquid coffee of the character defined in claim 4, including the step of moving a piston into said pressurizing and mixing chamber after hot water has been injected therein to pressurize said water.

6. A process for making liquid coffee in a dispensing machine comprising the steps of: dispensing a predetermined quantity of soluble coffee from a storage area into a cup at a first position having an opening in the bottom and a screen over the opening; moving said cup from said first position to a second position adjacent and between a cylinder and a receptacle for receipt of liquid coffee; temporarily sealing between said cylinder and said cup to form a pressure chamber; introducing a quantity of hot water into said pressure chamber; and moving a piston into said chamber to force hot water through the cup and the screen and into said receptacle whereby substantially all of said soluble coffee is dissolved to form a liquid coffee solution.

7. A process of making liquid coffee of the character defined in claim 6, including steps of dispensing liquid coffee from said receptacle into a container for use, and moving said cup to a third position between said first and second positions after the liquid coffee has been forced into said receptacle.

8. A process for making liquid coffee in a dispensing machine which includes a hopper containing soluble coffee, a cylinder having a piston movable between an upward position near the top of said cylinder and to a downward position near the bottom of said cylinder, a receptacle disposed beneath the cylinder and a cup having an opening in the bottom and a screen over the opening and movable between positions between said cylinder and hopper, below said hopper, and between said cylinder and receptacle, comprising the steps of: moving said piston to its upward position; moving said cup to a position beneath said hopper; dispensing a predetermined amount of soluble coffee from said hopper into said cup; moving said cup to said position between said cylinder and said receptacle; forming a pressure seal between said cup and cylinder to form a pressure chamber; introducing hot water into said pressure chamber; and moving said piston to its lower position to force hot water through said cup and screen into said receptacle to completely dissolve said soluble coffee and thereby form a coffee solution.

9. A process of making liquid coffee of the character defined in claim 8, including the step of moving the cup to a position between said position beneath said hopper, and said position between said cylinder and said receptacle, after the solution has been formed, whereby steam rising from said cup will not rise directly into said hopper and dampen the soluble coffee therein.

References Cited
UNITED STATES PATENTS

| | | | |
|---|---|---|---|
| 3,084,613 | 4/1963 | Maxson | 99—289X |
| 3,446,137 | 5/1969 | Pryor | 99—289 |
| 3,349,690 | 10/1967 | Heier | 99—289X |

FOREIGN PATENTS

| | | | |
|---|---|---|---|
| 934,152 | 8/1963 | Great Britain | 99—289 |

FRANK W. LUTTER, Primary Examiner

R. HALPER, Assistant Examiner

U.S. Cl. X.R.

99—71